(12) United States Patent
Sørli

(10) Patent No.: US 8,547,785 B2
(45) Date of Patent: Oct. 1, 2013

(54) METHOD AND APPARATUS FOR POSITIONING A CENTER OF A SEISMIC SOURCE

(75) Inventor: Jon Magnus Sørli, Svelvik (NO)

(73) Assignee: WesternGeco L.L.C., Houston, TX (US)

( * ) Notice: Subject to any disclaimer, the term of this patent is extended or adjusted under 35 U.S.C. 154(b) by 622 days.

(21) Appl. No.: 12/267,316

(22) Filed: Nov. 7, 2008

(65) Prior Publication Data

US 2009/0175124 A1 Jul. 9, 2009

Related U.S. Application Data

(62) Division of application No. 10/838,280, filed on May 4, 2004, now Pat. No. 7,466,632.

(51) Int. Cl.
*G01V 1/38* (2006.01)

(52) U.S. Cl.
USPC .......................................... 367/23

(58) Field of Classification Search
USPC .......................................... 367/15–21, 154
See application file for complete search history.

(56) References Cited

U.S. PATENT DOCUMENTS

| | | | |
|---|---|---|---|
| 3,412,704 A | 11/1968 | Buller et al. | |
| 3,479,638 A | 11/1969 | Rusnak | |
| 3,921,124 A | 11/1975 | Payton | |
| 3,953,826 A | 4/1976 | Brundrit et al. | |
| 4,027,616 A | 6/1977 | Guenther et al. | |
| 4,033,278 A | 7/1977 | Waters | |
| 4,063,213 A | 12/1977 | Itria et al. | |
| 4,087,780 A | 5/1978 | Itria et al. | |
| 4,110,726 A | 8/1978 | Dorrance et al. | |
| 4,404,664 A | 9/1983 | Zachariadis | |
| 4,506,352 A | 3/1985 | Brandsaeter et al. | |
| 4,693,336 A | 9/1987 | Newman | |
| 4,727,956 A | 3/1988 | Huizer | |
| 4,748,599 A | 5/1988 | Gjestrum et al. | |
| 4,798,156 A | 1/1989 | Langeland et al. | |
| 4,862,422 A | 8/1989 | Brac | |
| 4,868,793 A * | 9/1989 | Dunbar | 367/16 |
| 4,960,183 A | 10/1990 | Young, II | |
| 4,974,212 A * | 11/1990 | Sheiman | 367/21 |
| 5,052,814 A | 10/1991 | Stubblefield | |
| 5,113,377 A | 5/1992 | Johnson | |

(Continued)

FOREIGN PATENT DOCUMENTS

| | | |
|---|---|---|
| EP | 0 018 053 A1 | 10/1980 |
| EP | 0 018 053 B1 | 10/1980 |

(Continued)

OTHER PUBLICATIONS

Ashton, et al. 3D Seismic Surveys, Oilfield Review, Apr. 1994.*

(Continued)

*Primary Examiner* — Isam Alsomiri
*Assistant Examiner* — Krystine Breier

(57) ABSTRACT

The present invention provides a method and apparatus for positioning a center of a seismic source. The method includes determining a desired center-of-source of the seismic source and selecting one of a first and a second plurality of guns to form the seismic source based upon the desired center-of-source, a center-of-source of the first plurality being different than a center-of-source of the second plurality.

17 Claims, 5 Drawing Sheets

(56) References Cited

U.S. PATENT DOCUMENTS

| | | | |
|---|---|---|---|
| 5,142,498 A | 8/1992 | Duren | |
| 5,184,329 A | 2/1993 | Regnault et al. | |
| 5,281,773 A | 1/1994 | Duren | |
| 5,353,223 A | 10/1994 | Norton et al. | |
| 5,448,233 A | 9/1995 | Saban et al. | |
| 5,523,951 A | 6/1996 | Kriesgman et al. | |
| 5,532,975 A | 7/1996 | Elholm | |
| 5,619,474 A | 4/1997 | Kuche | |
| 5,771,202 A * | 6/1998 | Bale et al. | 367/20 |
| 5,784,335 A * | 7/1998 | Deplante et al. | 367/72 |
| 5,790,472 A | 8/1998 | Workman et al. | |
| 5,920,828 A | 7/1999 | Norris et al. | |
| 5,924,049 A | 7/1999 | Beasley et al. | |
| 5,995,452 A | 11/1999 | Bouyoucus | |
| 6,005,828 A | 12/1999 | Carroll et al. | |
| 6,011,752 A * | 1/2000 | Ambs et al. | 367/17 |
| 6,011,753 A | 1/2000 | Chien | |
| 6,028,817 A | 2/2000 | Ambs | |
| 6,031,789 A | 2/2000 | Broussard et al. | |
| 6,088,298 A | 7/2000 | Onat | |
| 6,256,589 B1 | 7/2001 | Gallotti Guimaraes | |
| 6,285,956 B1 * | 9/2001 | Bennett et al. | 702/14 |
| 6,292,436 B1 | 9/2001 | Rau et al. | |
| 6,459,653 B1 | 10/2002 | Kuche | |
| 6,510,390 B1 | 1/2003 | Bunting et al. | |
| 6,525,992 B1 | 2/2003 | Olivier et al. | |
| 6,590,831 B1 | 7/2003 | Bennett et al. | |
| 6,618,321 B2 | 9/2003 | Brunet | |
| 6,671,223 B2 | 12/2003 | Bittleston | |
| 6,681,710 B2 | 1/2004 | Semb | |
| 6,691,038 B2 | 2/2004 | Zajac | |
| 6,873,571 B2 | 3/2005 | Clayton et al. | |
| 6,932,017 B1 | 8/2005 | Hillesund et al. | |
| 7,047,898 B2 | 5/2006 | Petersen et al. | |
| 7,446,706 B2 | 11/2008 | Riley et al. | |
| 7,466,632 B1 * | 12/2008 | Sorli | 367/153 |
| 7,957,220 B2 * | 6/2011 | Howlid et al. | 367/16 |
| 2003/0039170 A1 | 2/2003 | Soreau et al. | |
| 2003/0151974 A1 | 8/2003 | Kutty et al. | |
| 2003/0168277 A1 | 9/2003 | Hopperstad et al. | |
| 2003/0220745 A1 | 11/2003 | Campbell | |
| 2004/0060498 A1 | 4/2004 | Petersen et al. | |
| 2004/0136266 A1 | 7/2004 | Howlid et al. | |
| 2004/0196737 A1 | 10/2004 | Nicholson | |
| 2005/0219948 A1 | 10/2005 | Naess | |
| 2009/0141587 A1 | 6/2009 | Welker et al. | |

FOREIGN PATENT DOCUMENTS

| | | |
|---|---|---|
| EP | 0 319 716 B1 | 6/1989 |
| EP | 0 321 705 B1 | 6/1989 |
| EP | 0 525 391 B1 | 2/1993 |
| EP | 0 613 025 A1 | 8/1994 |
| GB | 2 364 388 A | 1/2002 |
| GB | 2 412 965 A | 10/2005 |
| WO | 200155747 A1 | 8/2001 |
| WO | 02059650 A1 | 8/2002 |
| WO | 2005096015 A1 | 10/2005 |
| WO | 2005096018 A1 | 10/2005 |

OTHER PUBLICATIONS

Final Office Action (Feb. 19, 2010), Response to Office Action (Dec. 1, 2009), and Office Action (Sep. 2, 2009); U.S. Appl. No. 10/598,732 (US 2009-0141587 A1—Welker, et al).

Gikas, et al.; "Reliabiliky Analysis in Dynamic Systems: Implications for Positioning Marine Seismic Networks"; Geophysics; vol. 64, No. 4, pp. 1014-1022; Jul./Aug. 1999.

Armstrong et al.; "The Best Prameter Subset Using the Chebyhev Curve Fitting Criterion"; Mathematical Programming; vol. 27, No. 1, pp. 64-74; 1983.

Schmidt, "Solution for seismic source registration," Worldoil.com, 226(9): Sep. 1-3, 2005.

* cited by examiner

METHOD AND APPARATUS FOR POSITIONING A CENTER OF A SEISMIC SOURCE

RELATED APPLICATIONS

This application is a divisional of U.S. patent application Ser. No. 10/838,280, filed May 4, 2004 now U.S. Pat. No. 7,466,632, and titled METHOD AND APPARATUS FOR POSITIONING A CENTER OF A SEISMIC SOURCE, the entire disclosure of which is herein incorporated by reference.

FIELD

This invention relates generally to marine seismic surveying, and, more particularly, to positioning a center of a seismic source used in marine seismic surveying.

BACKGROUND

Seismic exploration is widely used to locate and/or survey subterranean geological formations for hydrocarbon deposits. Since many commercially valuable hydrocarbon deposits are located beneath bodies of water, various types of marine seismic surveys have been developed. In one type of marine seismic survey, the survey vessel tows a seismic source including a plurality of guns, such as airguns and the like, which are deployed along one or more strings or cables. As the source is towed over the survey area, the guns are fired to produce an acoustic signal, or "shot." The shot is directed down through the water into the earth beneath, where it is reflected from the various subterranean geological formations.

The reflected signals are received by one or more seismic sensors. In various alternative embodiments, the seismic sensors may be deployed in a receiver array including one or more seismic streamer cables, at the sea bed, in a borehole, or in any other desirable location. The received signals are typically digitized and then transmitted to the survey vessel or other data collection location. The digitized signals are referred to as "traces" and are recorded, and at least partially processed, at the survey vessel. The ultimate aim of this process is to build up a representation of the subterranean geological formations beneath the array. Analysis of the representation may indicate probable locations of hydrocarbon deposits in the subterranean geological formations.

The representation of the earth strata in the survey area is formed by combining data collected along a plurality of sail lines. In one embodiment, the sail lines are approximately straight lines that cross a portion of the survey area. However, persons of ordinary skill in the art should appreciate that the sail lines are rarely, if ever, perfectly straight. For example, wind, water currents, waves, steering of the survey vessel, and the like may cause the sail line to be less than perfectly linear. Furthermore, the data may be collected along paths that are not intended to be linear. For example, multi-azimuth coverage of the survey area may be provided by surveys using non-linear paths having shapes including elliptical paths, circular paths, and figure-8 paths.

In one embodiment, a single survey vessel may tow a single receiver array along each of the sail lines. Alternatively, a plurality of survey vessels may tow a plurality of receiver arrays along a corresponding plurality of the sail lines. In various alternative embodiments, the data may be collected during a single survey conducted over a short period of time, e.g. approximately one day, or it may be collected in multiple surveys performed a different times. For example, inclement weather and/or high seas may force a survey to be suspended before resuming hours or days later. For another example, historical data from previous surveys performed months or years earlier may be combined with new data to extend the survey or to fill in deficiencies in coverage that may be introduced by currents, obstacles such as platforms, and the like. And for yet another example, data from repeat surveys may be used to analyze and monitor changes in productive oil and/or gas reservoirs.

The accuracy and/or resolution of the representation formed using the acquired data may be limited by uncertainties in the actual path of the seismic source and/or the receivers through the water. Accordingly, the survey vessel typically attempts to tow the seismic source so that a geometric center-of-source of the guns in the seismic source follows a desired sail line. However, the center-of-source rarely, if ever, precisely follows the desired sail line. For example, water currents, wind, waves, and the like may divert one or more guns in the seismic source from the desired path.

The present invention is directed to addressing one or more aspects of the problems described above.

SUMMARY

In one aspect of the instant invention, an apparatus is provided for positioning a center of a seismic source. The apparatus includes first and second pluralities of guns configured so that a center-of-source of the first plurality is different than a center-of-source of the second plurality. The apparatus also includes a controller communicatively coupled to the first and second pluralities of guns and capable of selecting one of the first and second pluralities of guns to form the seismic source based on a desired center-of-source.

In another aspect of the present invention, a method is provided for determining a desired center-of-source of a seismic source and selecting one of a first and a second plurality of guns to form the seismic source based upon the desired center-of-source, a center-of-source of the first plurality being different than a center-of-source of the second plurality.

BRIEF DESCRIPTION OF THE DRAWINGS

The invention may be understood by reference to the following description taken in conjunction with the accompanying drawings, in which like reference numerals identify like elements, and in which.

Figure 1:
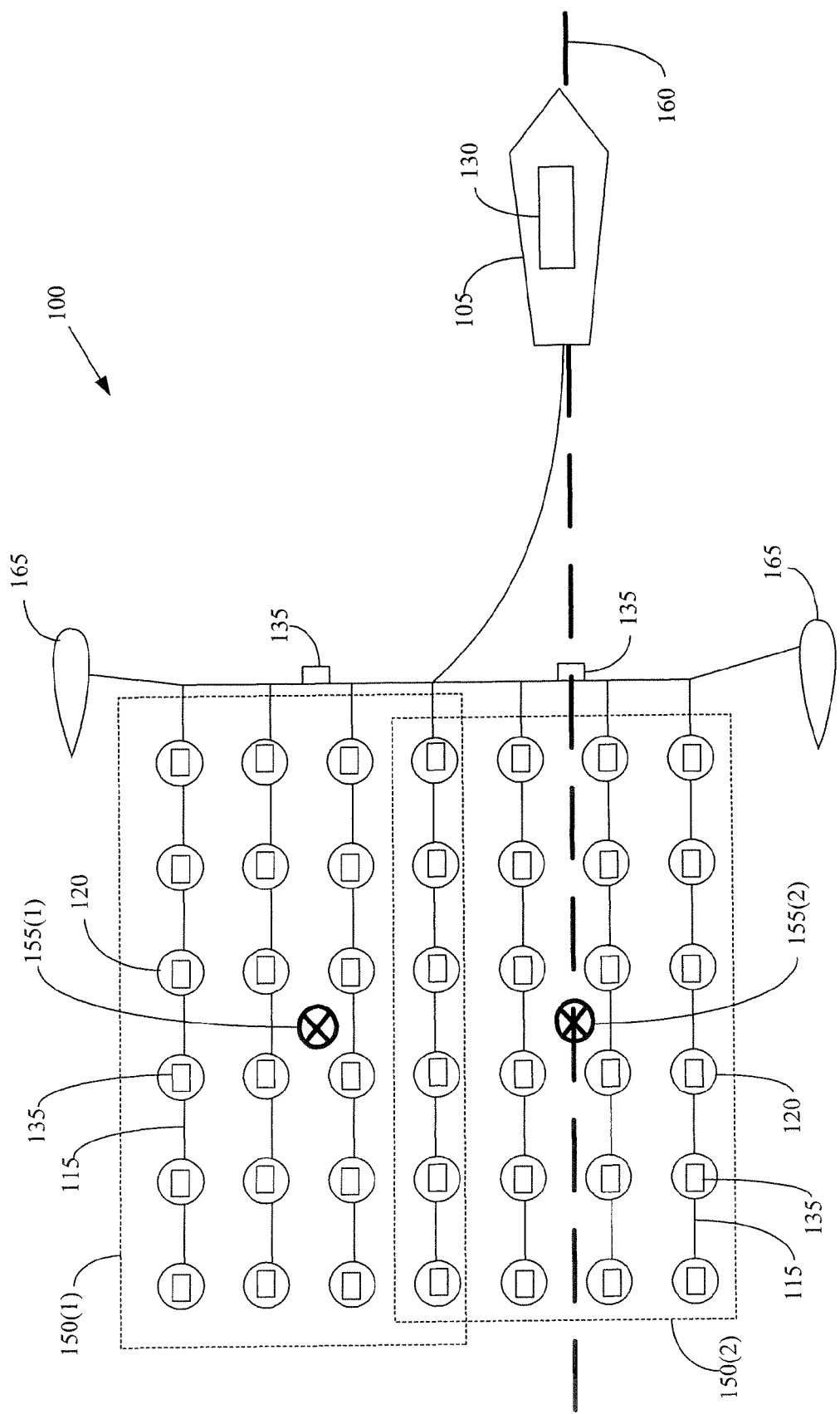
FIG. 1 conceptually illustrates a first embodiment of a system for providing a seismic shot in accordance with the present invention in which the guns in the seismic source differ horizontally.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention is directed to positioning a center of a seismic source by selecting a gun configuration. As will be discussed in detail below, a center-of-source of a selected configuration of the guns in the seismic source may be positioned proximate a desired location, such as a sail line or other non-linear path, by forming the gun configuration from one or more selected guns deployed in a gun array. Although some of the guns may be in more than one of the possible gun configurations, each gun configuration includes at least one gun that is not found in the other gun configurations so that each gun configuration has a different center-of-source. By positioning the center of the seismic source, the uncertainty in the position of the center-of-source of the seismic source may be reduced. The following figures show various exemplary embodiments of the present invention. However, persons of ordinary skill in the art will appreciate that these embodiments are illustrative in nature and are not intended to limit the present invention.

FIG. 1 conceptually illustrates a first embodiment of a system 100 for providing seismic shots. The system 100 includes a survey vessel 105 coupled to a gun array 110 formed of a plurality of cables 115 having a plurality of guns 120, such as airguns and the like, attached thereto. The gun array 110 shown in FIG. 1 is a two-dimensional array. However, in alternative embodiments such as described below, the gun array 110 may also be one-dimensional or three-dimensional. Persons of ordinary skill in the art should also appreciate that, in alternative embodiments, the system 100 may also include a plurality of seismic receivers (not shown). For example, the survey vessel 105 may tow an array of seismic receivers (not shown). Alternatively, the seismic receivers (not shown) may be towed by another survey vessel, or they may be deployed on the sea bed, in a borehole, or in any other desirable location.

In the illustrated embodiment, the gun array 110 includes seven cables 115. However, the present invention is not limited to seven cables 115 and, in alternative embodiments any desirable number of cables 115 may be used. Persons of ordinary skill in the art will appreciate that the desirable number of cables 115 may be influenced by such factors as the size of the survey vessel 105, the capabilities of one or more engines (not shown) that power the survey vessel 105, the drag of the gun array 110, the area of the survey region, and the like.

The cables 115 shown in FIG. 1 are deployed with an approximately equal separation in the cross-line direction. However, in alternative embodiments, any desirable cable spacing may be selected, including unequal spacing between the cables 115. Furthermore, persons of ordinary skill in the art will appreciate that, in operation, the spacing of the cables 115 may be affected by factors including wind, water currents, waves, the heading and/or speed of the survey vessel 105, and the like.

The guns 120 shown in FIG. 1 are approximately equally spaced in the in-line direction. However, persons of ordinary skill in the art will appreciate that the present invention is not limited to equally-spaced guns 120. In various alternative embodiments, the guns 120 may be spaced in any desirable manner, including unequal spacing in the in-line direction.

Each of the plurality of guns 120 is communicatively coupled to a controller 130, which may be deployed on the survey vessel 105. The controller 130 is capable of providing one or more signals to selected portions of the plurality of guns 120. The provided signals may be used to initiate a seismic shot from the guns 120 in the selected portions. Persons of ordinary skill in the art will appreciate that the guns 120 may be communicatively coupled to the controller 130 in any desirable manner known to the art including, but not limited to, wires deployed in the plurality of cables 115, radiofrequency transceivers (not shown), and the like. For example, one function of the cables 115 may be to transmit command and control information from the controller 130 to the guns 120.

In one embodiment, each gun 120 is individually communicatively coupled to the controller 130 so that the controller 130 may provide a separate signal to initiate firing each gun 120. Alternatively, subsets of the guns 120 may be communicatively coupled to the controller 130 so that the controller 130 may provide a single signal to initiate firing the guns 120 in the selected subsets at substantially the same time. For example, the guns 120 deployed along each of the plurality of cables 115 may be communicatively coupled to the controller 130 so that the controller 130 may provide a single signal to initiate firing the guns 120 deployed along a selected cable 115.

The guns 120 may be fired at the same time to generate the seismic shot. However, the present invention is not limited to simultaneously firing the guns 120. In alternative embodiments, the guns 120 may be fired at different times. For example, a timing skew of a few milliseconds between firings of the guns 120 may be introduced to control the direction of the energy of the seismic shot. In one embodiment, the controller 130 determines the timing skew and provides one or more signals to initiate firing of the guns 120 in the appropriate temporal sequence.

The plurality of guns 120 in the gun array 110 may be configured to form one or more of a plurality of seismic sources 150(1-2). In the illustrated embodiment, a center-of-source 155(1) (indicated by a crossed circle in FIG. 1) of the configuration of guns 120 used to form the first seismic source 150(1) is different than a center-of-source 155(2) (also indicated by a crossed circle in FIG. 1) of the configuration of guns 120 used to form the second seismic source 150(2). For example, the centers-of-source 155(1-2) may be different because each seismic source 150(1-2) includes at least one gun 120 that is not found in the other seismic source 150(1-2). However, it will be appreciated that, in alternative embodiments, any desirable technique for making the center-of-source 155(1) of the first seismic source 150(1) different than the center-of-source 155(2) of the second seismic source 150(2) may be used.

In the illustrated embodiment, the seismic sources 150(1-2) also include guns 120 that are common to the two seismic sources 150(1-2). However, persons of ordinary skill in the art will appreciate that the present invention does not require that the seismic sources 150(1-2) include guns 120 that are common to the two seismic sources 150(1-2). Moreover, if more than one gun array 110 is used, the guns 120 may not even be a part of the same gun array 110. Furthermore, it should be appreciated that the guns 120 may be associated with any desirable number of seismic sources 150(1-2). For example, the guns 120 may be associated with more than two seismic sources 150(1-2).

One or more positioning devices 135 are deployed proximate the gun array 110. In the illustrated embodiment, a positioning device 135 is coupled to each gun 120. However, persons of ordinary skill in the art will appreciate that, in alternative embodiments, not all of the guns 120 may be coupled to a positioning device 135. Moreover, the positioning devices 135 may not always be coupled to the guns 120. For example, the positioning devices 135 may be coupled to the cable 115 proximate the guns 120, or at any other desirable position along one or more of the cables 115. In one embodiment, the positioning devices 135 are Global Positioning System devices. However, in alternative embodiments, the positioning devices 135 may be inertial positioning devices, acoustic positioning devices, and the like.

The positioning devices 135 provide information indicative of their position to the controller 130. The provided positioning information may indicate the absolute position of the positioning device 135. For example, the positioning device 135 may be a Global Positioning System device capable of providing information indicative of the longitude and latitude of the positioning device 135. Alternatively, the positioning device 135 may indicate the relative position of the positioning device 135. For example, the positioning device 135 may provide information indicative of the location of the positioning device 135 relative to the survey vessel 105, one or more other positioning devices 135, or any other desirable reference point. In yet another alternative embodiment, the positioning device 135 may indicate both the absolute position and the relative position of the positioning device 135.

The controller 130 determines the location of the center-of-source 155(1-2) of each of the seismic sources 150(1-2) using the positioning information provided by the positioning devices 135. In one embodiment, the controller 130 may compute the center-of-source 155(1-2) using the position information provided by each of the positioning devices 135 deployed proximate the guns 120. For example, the controller 130 may compute the center-of-source 155(1-2) such that a vector sum of vectors (not shown) from the center-of-source 155(1-2) to each positioning device 135 is minimized and/or reduced to approximately zero. Alternatively, the controller may compute the center-of-source 155(1-2) using a known relation between the positioning devices 135 and the center-of-source 155(1-2). For example, the positioning devices 135 may be deployed such that the center of source 155(1-2) is separated from the positioning device 135 by approximately a known distance along a direction approximately parallel to the cables 115.

The survey vessel 105 may be physically steered to position the gun array 110 approximately above a sail line 160. For example, a heading of the survey vessel 105 may be changed to position the towed gun array 110 approximately above the sail line 160. As discussed above, the location of the sail line 160 may be predetermined to provide a new sail line location to a seismic survey, to revisit a previously surveyed sail line, to provide infill for a current or previous seismic survey, or for any other reason. The path of the gun array 110 may also be physically steered using one or more deflector devices 165, as should be appreciated by persons of ordinary skill in the art. In various alternative embodiments, the sail line 160 may be approximately linear or be a portion of a non-linear path such as an elliptical path, a circular path, a figure-8 path, and the like.

Various factors, such as wind, water currents, waves, the heading and/or speed of the survey vessel 105, and the like, may result in the gun array 110 not being accurately positioned above the sail line 160. Accordingly, the controller 130 is capable of selecting one of the seismic sources 150(1-2) such that the corresponding center-of-source 155(1-2) of the selected seismic source 150(1-2) lies approximately along the sail line 160.

In one embodiment, the configuration of the guns 120 used to form the seismic sources 150(1-2) may be pre-determined and the controller 130 may select one of the pre-determined gun configurations to form the seismic sources 150(1-2) such that the corresponding center-of-source 155(1-2) of the selected seismic source 150(1-2) lies approximately along the sail line 160. However, in alternative embodiments, the controller 130 may determine membership of guns 120 within the seismic sources 150(1-2). For example, the controller 130 may use the position information provided by the positioning devices 135 to determine the membership of the guns 120 in the seismic source 150(1) such that the corresponding center-of-source 155(1) of the seismic source 150(1) lies approximately along the sail line 160.

By selecting one of the seismic sources 150(1-2), either from one or more pre-determined seismic sources 150(1-2) or from one or more seismic sources 150(1-2) determined by the controller 130, the uncertainty in the position of the corresponding center-of-source 155(1-2) relative to the sail line 160 may be reduced. For example, the uncertainty in the position of the center-of-source 155(1-2) relative to the sail line 160 in an exemplary gun array 110 having a plurality of cables 110 that are equally separated in a cross-line direction by approximately eight meters may be reduced to about a few meters. Consequently, the amount of physical steering required, and the resulting steering noise in the acquired seismic data, may be reduced.

Figure 2:
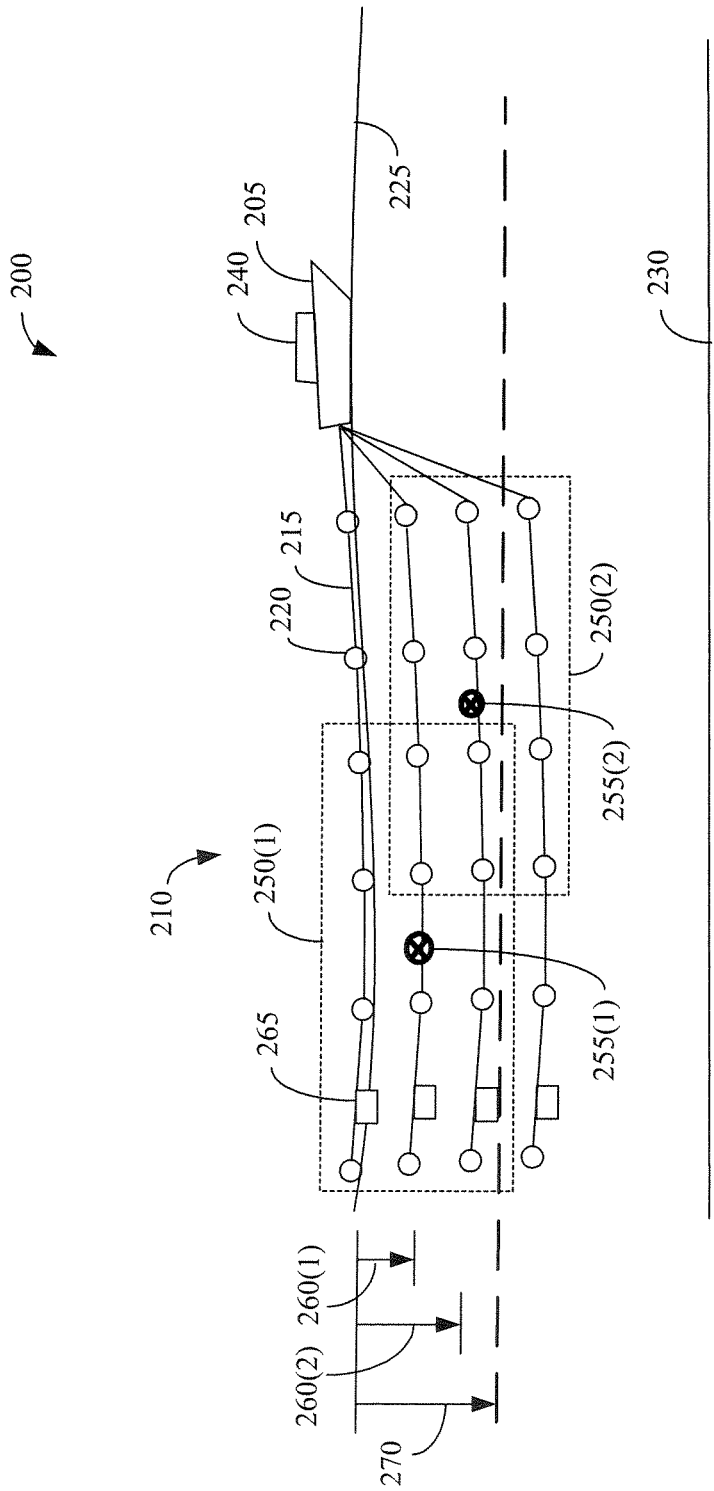
FIG. 2 conceptually illustrates a second embodiment of a system for providing a seismic shot in accordance with the present invention in which the guns in the seismic source differ in depth.

FIG. 2 conceptually illustrates a second embodiment of a system 200 for providing a seismic shot. In the system 200, the groupings of guns differ vertically, rather than horizontally. The system 200 includes a survey vessel 205 coupled to a gun array 210 comprising a plurality of cables 215 having a plurality of guns 220, such as airguns and the like, attached thereto. The plurality of cables 215 are deployed at different depths beneath the surface 225 of a body of water and heights above the floor 230 of the body of water. Although a plurality of cables 215 a shown in FIG. 2, in one alternative embodiment, a single cable 215 having a plurality of guns 220 suspended at different depths below the cable 215 may be used.

In the illustrated embodiment, the system 200 is a two-dimensional gun array 210 oriented in an approximately vertical plane. However, in alternative embodiments, the system 200 may also be a portion of a three-dimensional gun array. Although not shown in FIG. 2, in one alternative embodiment one or more additional pluralities of cables 215 may be distributed in a horizontal direction (i.e. in a direction perpendicular to the page) to form a three-dimensional gun array 210. For example, the system 100 shown in FIG. 1 may be considered as a top-down view of a three-dimensional gun array 210 and the system 200 may be considered a side-view of the three-dimensional gun array 210.

Each of the plurality of guns 220 are communicatively coupled to a controller 240 on the survey vessel 205. As discussed above, the controller 240 is capable of providing one or more signals to selected portions of the plurality of guns 220 that may be used to initiate one or more seismic shots from the guns 220 in the selected portions. The plurality of guns 220 in the seismic source array 215 may be configured to form a plurality of seismic sources 250(1-2). In the illustrated embodiment, a center-of-source 255(1) (indicated by a crossed circle) of the first seismic source 250(1) is different than a center-of-source 255(2) (also indicated by a crossed circle) of the second seismic source 250(2). For example, the center-of-source 255(1) of the first seismic source 250(1) is at a first depth 260(1) that is different than a second depth of 260(2) the center-of-source 255(2) of the second seismic source 250(2) because seismic sources 250(1-2) each include at least one gun 220 that is not found in the other seismic source 250(1-2). However, as discussed above, the centers-of-source 255(1-2) may differ for any desirable reason and in any desirable direction. For example, in a three-dimensional array 210, the centers-of-source 255(1-2) may differ in both a horizontal and a vertical direction.

One or more positioning devices 265 are deployed proximate the gun array 210. In the illustrated embodiment, the positioning devices 265 are deployed along one or more of the cables 215. In one embodiment, the positioning devices 265 are Global Positioning System devices. However, in alternative embodiments, the positioning devices 265 may be inertial positioning devices, acoustic positioning devices, depth detectors, and the like. The positioning devices 265 provide information indicative of their position (i.e. the depth of the corresponding cable 215) to the controller 240.

The provided positioning information may indicate the absolute depth of the positioning device 265 or, alternatively, the positioning device 265 may indicate the depth of the positioning device 265 relative to the survey vessel 105, the surface 225, the one or more other positioning devices 265, or any other desirable reference point. In some embodiments, such as the three-dimensional gun array 210, the provided positioning information may also indicate the absolute position (e.g. the latitude and longitude) of the positioning device 265 or, alternatively, the positioning device 265 may indicate the relative location of the positioning device 265 relative to the survey vessel 105, the surface 225, the one or more other positioning devices 265, or any other desirable reference point.

The controller 240 determines the location of the center-of-source 255(1-2) of each of the seismic sources 250(1-2) using the positioning information provided by the positioning devices 265. In various alternative embodiments, it may be desirable to position the center-of-source 255(1-2) proximate a selected depth 270. For example, it may be desirable to position the center-of-source 255(1-2) proximate the selected depth 270 to reduce the effect of one or more ghosts, multiples, and/or other artifacts in the acquired data. Accordingly, the controller 230 is capable of selecting one of the seismic sources 250(1-2) such that the corresponding center-of-source 255(1-2) of the selected seismic source 250(1-2) is proximate the selected depth 270. As discussed above, the controller 230 may also be capable of selecting a membership and/or a configuration of the guns 220 in one or more of the seismic sources 250(1-2). By selecting one of the seismic sources 250(1-2), the difference between the depth of the corresponding center-of-source 255(1-2) and the selected depth 270 may be reduced. Consequently, the performance of various ghost removal techniques, multiple removal techniques, and other data processing techniques may be enhanced.

Figure 3B:
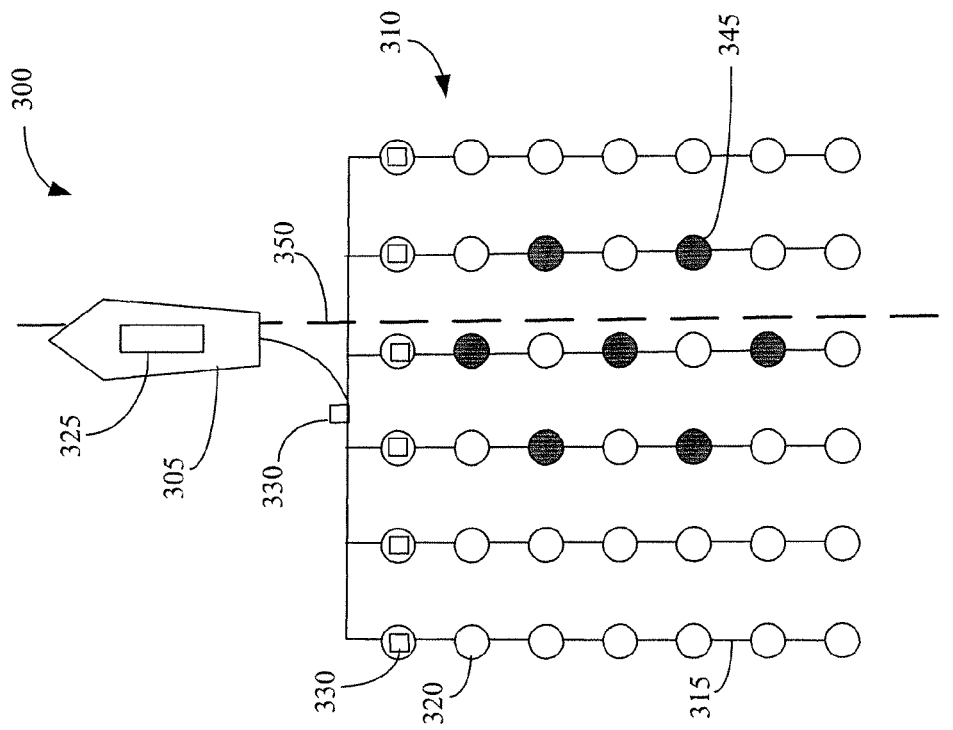
FIGS. 3A and 3B conceptually illustrate a third embodiment of a system for providing a seismic shot in accordance with the present invention.
Figure 3A:
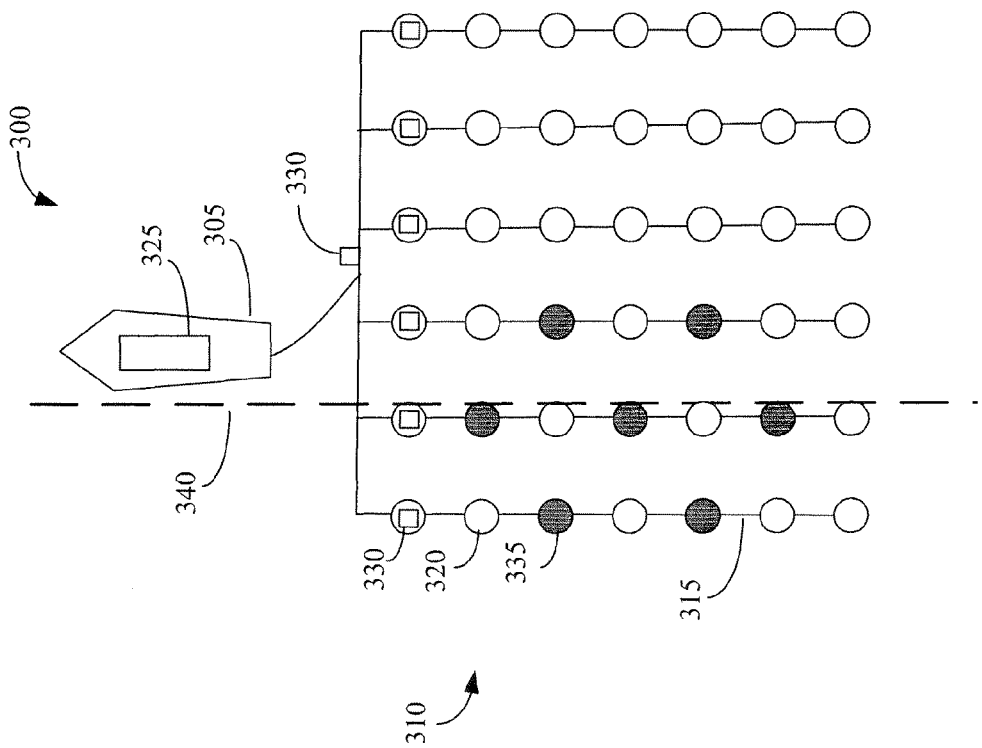

FIGS. 3A and 3B conceptually illustrate a third embodiment of a system 300 for providing a seismic shot. The system 300 includes a survey vessel 305, which is coupled to a gun array 310 formed using a plurality of cables 315 having a plurality of guns 320 attached thereto. As discussed above, each of the plurality of guns 320 are communicatively coupled to a controller 325, which is capable of providing one or more signals to selected portions of the plurality of guns 320 that may be used to initiate one or more seismic shots from the guns 320 in the selected portions. In various alternative embodiments, one or more positioning devices 330 are deployed proximate the guns 320 and/or along one or more of the cables 315. The positioning devices 330 provide information indicative of their position to the controller 325.

In the third embodiment of the system 300, the controller 325 may select a configuration of guns 320 arranged in a predetermined pattern to form a first seismic source 335, as shown in FIG. 3A. For example, the first seismic source 335 may include guns 320 arranged in a center-filled hexagonal pattern, such as may be used in an alternate invariant source array. However, in alternative embodiments, the first seismic source 335 may include guns 320 arranged in any desirable pattern including, but not limited to, a square, a cross, a circle, and the like. As discussed above, the controller 325 may also determine membership of one or more guns 320 in one or more seismic sources 335.

The controller 325 may select the first seismic source 335 so that a center-of-source of the first seismic source 335 is proximate a desired sail line 340. As discussed above, the controller may select the first seismic source 335 using information provided by one or more of the positioning devices 330, as well as a predetermined location of the sail line 340. The controller 325 may alternatively select a second configuration of guns 320 arranged in a predetermined pattern to form a second seismic source 345 (also indicated by cross-hatching), as shown in FIG. 3B. For example, instead of being shifted to the right of the desired sail line 340, as shown in FIG. 3A, the gun array 310 may be shifted to the left of the desired sail line 350, as shown in FIG. 3B.

Figure 4A:
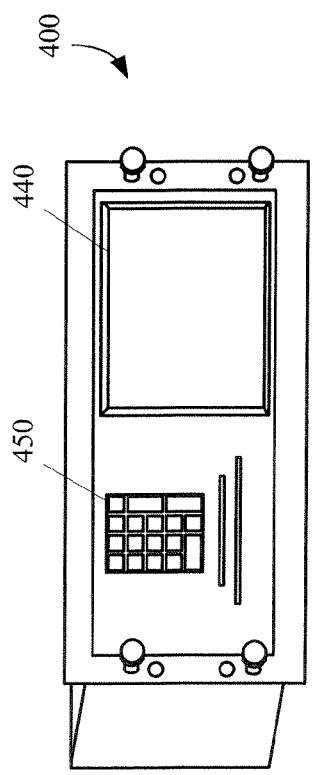
FIGS. 4A and 4B conceptually illustrate a computing apparatus that may be used in the first, second, and third embodiments illustrated in FIGS. 1, 2, 3A, and 3B.
Figure 4B:
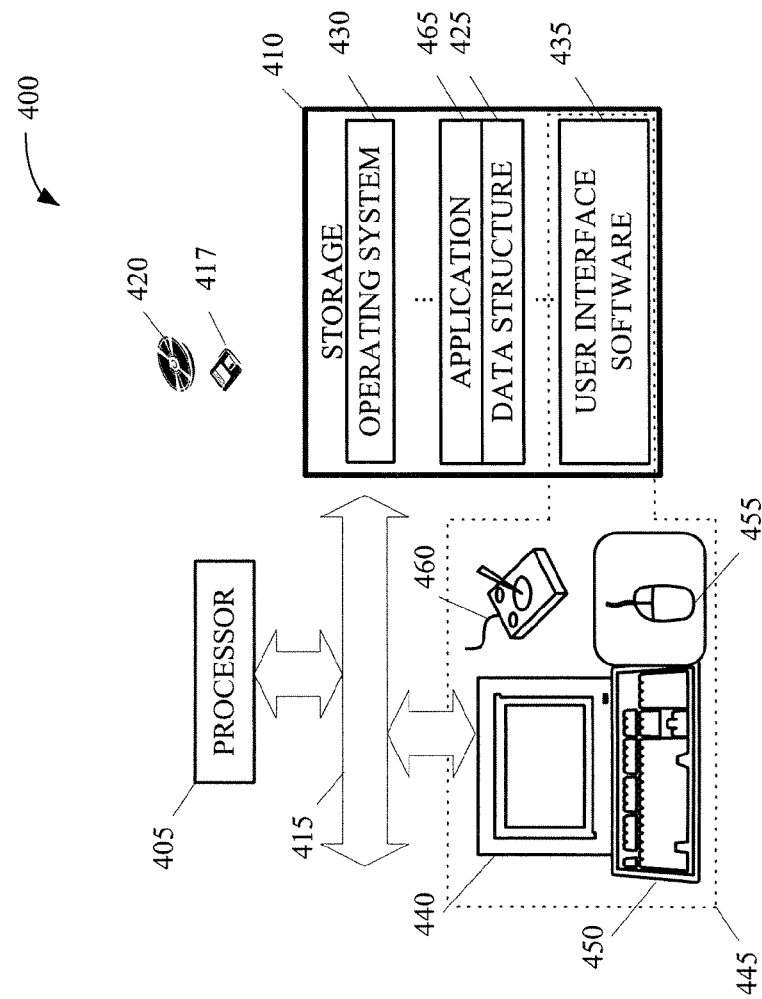

Referring now to FIGS. 1, 2, 3A, and 3B, the controllers 130, 240, 325 may be embodied, at least in part, in a computing apparatus 400 that may be used to perform the aforementioned operations, as illustrated in FIGS. 4A and 4B. The computing apparatus 400 includes a processor 405 communicating with some storage 410 over a bus system 415. The storage 410 may include a hard disk and/or random access memory ("RAM") and/or removable storage such as a floppy magnetic disk 417 and an optical disk 420. The storage 410 is encoded with a data structure 425 storing the signals collected as discussed above, an operating system 430, user interface software 435, and an application 465. The user interface software 435, in conjunction with a display 440, implements a user interface 445. The user interface 445 may include peripheral I/O devices such as a key pad or keyboard 450, a mouse 455, or a joystick 460. The processor 405 runs under the control of the operating system 430, which may be practically any operating system known to the art. The application 465 is invoked by the operating system 430 upon power up, reset, or both, depending on the implementation of the operating system 430.

Figure 5:
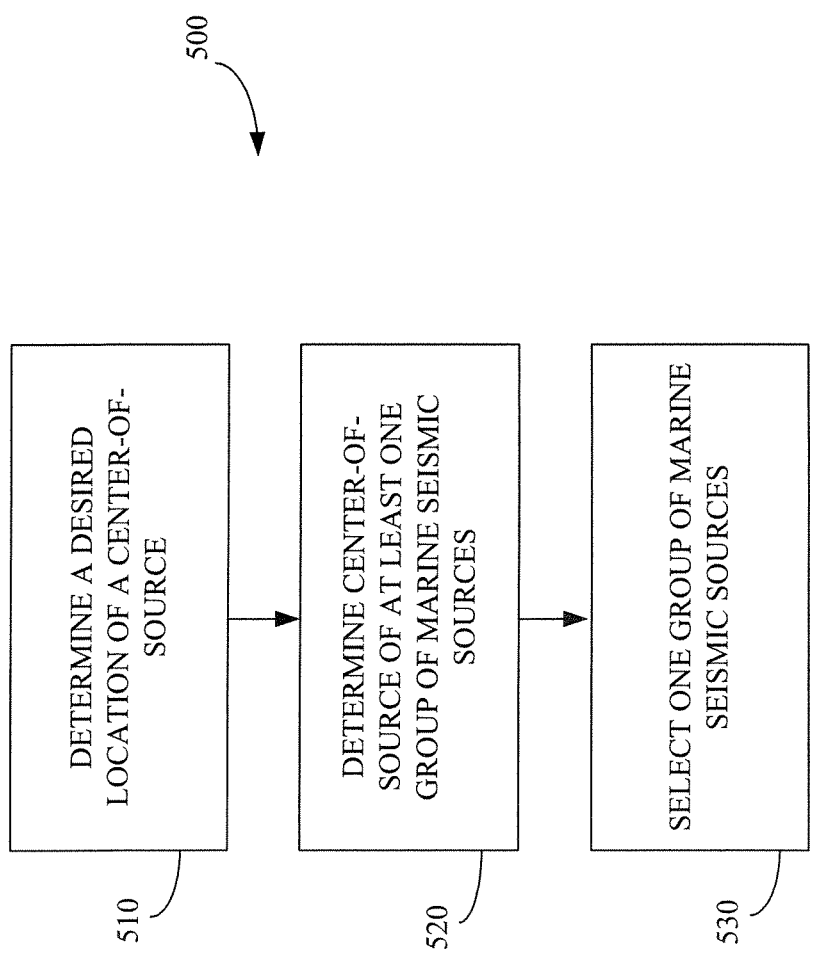
FIG. 5 conceptually illustrates a method for providing a seismic shot in accordance with the present invention.

In one embodiment, the computing apparatus 400 may be programmed to perform a method for positioning a center of a seismic source, such as the exemplary method 500 shown in FIG. 5. Alternatively, the storage 410 may be encoded with instructions that when executed enable the computing apparatus to perform the exemplary method 500. In the illustrated embodiment of the exemplary method 500, a desired location of a center-of-source may be determined (at 510). As discussed above, the desired location of the center-of-source may be determined (at 510) based upon a sail line, a depth, a combination of the two, or any other location. A center-of-source of at least configuration of guns used to form at least one seismic source is then determined (at 520). In one embodiment, a controller, which may be embodied in the computing apparatus 410, determines (at 520) a plurality of centers-of-sources of a corresponding plurality of gun configurations that may be used to form a plurality of seismic sources. The controller may also determine membership of one or more guns in the one or more seismic sources. The controller then selects (at 530) one of the seismic sources. For example, the controller may select (at 530) one of the seismic sources by comparing the desired center-of-source with the determined plurality of centers-of-sources of the corresponding plurality of gun configurations.

Accordingly, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    determining a first plurality of guns as being disposed substantially along a fixed path along which seismic data are to be acquired;
    actuating the first plurality of guns;
    detecting that the first plurality of guns has drifted away from the fixed path;
    determining a geometric center of a second plurality of guns;
    comparing the fixed path with the geometric center of the second plurality of guns during acquisition of the seismic data; and
    actuating the second plurality of guns as the geometric center of the second plurality of guns substantially aligns with the fixed path.

2. The method of claim 1, wherein the first plurality of guns has at least one gun in common with the second plurality of guns.

3. The method of claim 1, wherein actuating the second plurality of guns comprises receiving a signal indicative of a location of the second plurality of guns.

4. The method of claim 3, wherein receiving the signal indicative of the location of the second plurality of guns comprises receiving the signal from a global positioning system associated with the second plurality of guns.

5. The method of claim 3, wherein receiving the signal indicative of the location of the second plurality of guns comprises receiving the signal from an acoustic positioning device associated with the second plurality of guns.

6. The method of claim 3, wherein receiving the signal indicative of the location of the second plurality of guns comprises receiving the signal from an inertial positioning device associated with the second plurality of guns.

7. The method of claim 3, wherein receiving the signal indicative of the location of the second plurality of guns comprises receiving the signal from a depth detector associated with the second plurality of guns.

8. The method of claim 1, wherein the first plurality of guns is in a first predetermined geometrical pattern and the second plurality of guns is in a second predetermined geometrical pattern that is different from the first predetermined geometrical pattern.

9. The method of claim 1, further comprising deploying a plurality of cables having the first plurality of guns and the second plurality of guns, wherein the first plurality of guns is arranged in a first predetermined geometrical pattern and the second plurality of guns is arranged in a second predetermined geometrical pattern different from the first predetermined geometrical pattern.

10. The method of claim 9, wherein the cables are deployed parallel to each other along the fixed path.

11. The method of claim 1, wherein the fixed path is a planned sail line.

12. The method of claim 1, wherein the fixed path is a straight path.

13. The method of claim 1, wherein the fixed path is a circular path.

14. The method of claim 1, wherein the fixed path is an elliptical path.

15. The method of claim 1, wherein the fixed path is a figure-8 path.

16. The method of claim 1, wherein the fixed path is a previously surveyed sail line.

17. The method of claim 1, wherein detecting that the first plurality of guns has drifted away from the fixed path comprises:

determining a geometric center of the first plurality of guns;

comparing the fixed path with the geometric center of the first plurality of guns during acquisition of the seismic data; and determining that the first plurality of guns has drifted away from the fixed path when the geometric center of the first plurality of guns does not substantially align with the fixed path.

* * * * *